Patented Apr. 12, 1949

2,466,788

UNITED STATES PATENT OFFICE 2,466,788

FUNGICIDAL NICOTINIUM SALT COMPOSITIONS

Charles F. Woodward, Abington, Pa., and Frank L. Howard, Kingston, and Harry L. Keil, Wakefield, R. I., and Leopold Weil, Philadelphia, Pa., assignors to the United States of America as represented by the Secretary of Agriculture No Drawing. Application December 5, 1945, Serial No. 633,026

5 Claims. (Cl. 167—34)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to fungicidal compositions, and more particularly, to fungicidal compositions containing nicotinium salts, and has among its objects the provision of such compositions for use in agriculture and industry. Other objects will be apparent from the description of the invention.

Nicotine has long been employed for combating insects and is particularly effective as a contactant and/or fumigant against many species of small soft-bodied insects. Several "fixed nicotine" compositions, such as nicotine bentonite and nicotine tannate, have been successfully used in protecting plant surfaces, wherein a lasting deposit of the toxicant is desirable, against chewing insects.

The various nicotine insecticides used in the prior art, however, have exhibited little or no fungicidal activity. For example, nicotine bentonite is effective in the control of the codling moth larvae, but it has little or no effect on the fungi which attack apple trees and fruit. Furthermore, attempts to incorporate conventional basic fungicides into applications of fixed nicotine compositions have generally resulted in a disadvantageous loss of nicotine with a correspondingly decreased insecticidal effectiveness. In addition, injury to plant foliage is usually increased.

We have found that certain non-metallic derivatives of nicotine which are represented by the formula

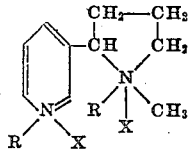

wherein R is a monovalent radical selected from the group consisting of alkyl, aralkyl, and substituted aralkyl, and X is a member selected from the group consisting of chloride, bromide, iodide, cyanide, thiocyanate, and fatty acid anions, said fatty acid anion having from 2 to 18 carbon atoms, when incorporated in a carrier, are efficient in the control of insects, fungi (including yeasts and Actinomycetes), bacteria, and nematodes. Examples of such derivatives are dibenzyl nicotinium dibromide, di(p-chlorobenzyl) nicotinium dichloride, di(p-nitrobenzyl) nicotinium dibromide, di(2,4-dichlorobenzyl) nicotinium dichloride, di(3,4-dichlorobenzyl) nicotinium dichloride, dimethyl nicotinium diiodide, dilauryl nicotinium dibromide, dibutyl nicotinium dibromide, dilauryl nicotinium dithiocyanate, dilauryl nicotinium dichloride, dilauryl nicotinium dioleate, dioctadecyl nicotinium diacetate, dioctadecyl nicotinium divalerate, and dicetyl nicotinium dioleate.

The carrier which is employed is a selective material or materials into which the nicotine derivative is incorporated to form the fungicidal composition, and may be an adjuvant, solvent, coupling agent, dust, or other material or materials chosen for a particular intended use so to obtain maximum effective use of the toxicant incorporated therein.

The dialkyl nicotinium dihalides disclosed above were prepared by reaction of nicotine and the corresponding alkyl halide in the approximate ratio of one mole of nicotine to 2 moles of alkyl halide. The diaralkyl nicotinium dihalides and substituted diaralkyl nicotinium dihalides were prepared in a similar manner. The preparation of the nicotinium salts having thiocyanate or fatty acid anions was accomplished by reaction of the corresponding nicotinium dihalide with the sodium salts of thiocyanic acid and of the fatty acid, respectively. Approximately two moles of the sodium salt were used for each mole of the disubstituted nicotinium dihalide.

The technique used for evaluating the fungicidal value of the compounds was essentially that suggested by the Committee on Standardization of Fungicidal Tests (The Slide Germination Method of Evaluating Protectant Fungicides, Phytopath. 33, 627–32 [1943]). Since this method was designed for the testing of particulate compounds and the nicotinium derivatives were used in true solution or molecular dispersion, the liquid was applied as a uniform drop of known volume and toxicant content, rather than by spraying on the slides. *Macrosporium sarcinaeforme* Cav. spores were used as the test fungus, and counts of spores germinated were made and plotted on a logarithmic-probability scale, so that a straight line probability curve could be obtained, thus making possible the determination of points not found experimentally by interpolation and extrapolation. The concentration of the various nicotinium salts required to kill 50 percent (LD 50) and 90 percent (LD 90) of the spores (fungitoxicity), were generally obtained by this procedure.

In order to establish the fact that the nicotinium salts were relatively non-injurious to plant organs at concentrations sufficiently toxic to certain micro-organisms, phytotoxicity tests were made on succulent uninjured Comet tomato leaves in a greenhouse. The leaves were dipped in a given solution of the toxicant for five seconds, and the percentage of killed tissue observed after five days. The concentrations of nicotinium salts were plotted against percentages of devitalized tissue on a logarithmic-probability scale, and the LD 50 values (phytotoxicity), that is, the concentration of nicotinium salts which killed 50 percent of the leaf tissue area, were obtained by inspection of the resulting graphs.

The fungitoxicity and phytotoxicity data obtained on some of the nicotinium salts employed are summarized in the following table:

*Effect of the Composition and Structure of Nicotinium Derivatives on Their Ability to Inhibit the Germination of* Macrosporium sarcinaeforme *Spores and on Their Injuriousness to Tomato Foliage*

| Compound | Fungitoxicity | | Phytotoxicity, LD50 [c] |
|---|---|---|---|
| | LD 50 [a] | LD 90 [b] | |
| dibenzyl nicotinium dibromide | 230 | 330 | 20 |
| di(p-chlorobenzyl) nicotinium dichloride | 38 | 125 | 15 |
| di(p-nitrobenzyl) nicotinium dibromide | 115 | 250 | 4 |
| di(2, 4-dichlorobenzyl) nicotinium dichloride | 37 | 125 | 12 |
| di-(3, 4-dichlorobenzyl) nicotinium dichloride | 25 | 125 | 19 |
| dimethyl nicotinium diiodide | 125 | 300 | 6.1 |
| dilauryl nicotinium dibromide | 3 | 80 | 1.2 |
| dibutyl nicotinium dibromide | 540 | 800 | 17 |
| dilauryl nicotinium dithiocyanate | 12 | 38 | 0.5 |
| dilauryl nicotinium dichloride | 8 | 50 | 0.7 |
| dilauryl nicotinium dioleate | 23 | 45 | 0.9 |
| dioctadecyl nicotinium diacetate | 27 | 67 | 20 |

[a] Parts per million required to kill 50% of fungus spores.
[b] Parts per million required to kill 90% of fungus spores.
[c] Parts per hundred required to kill 50% of tomato leaf area.

The fungitoxicity and phytoxicity of the nicotinium salts are appreciably affected by the nature of the R and X groups combined with the nicotine. However, in general, all nicotinium salts are effective fungicides, as indicated in the above table. The table indicates, furthermore, that the LD 50 fungitoxicity values are only a very small fraction of the LD 50 phytotoxicity values, thereby establishing the desirable margin of safety between the toxicant concentration necessary to control the fungus and the toxicant concentration which is seriously injurious to the host.

Variation in the type of R and X radicals attached to the nitrogen in the pyridine ring and the pyrrolidine ring markedly affects the surface activity, solubility, and compatibility of the compounds in addition to their insecticidal properties. This must be consdered in the selection of carriers, such as adjuvants, and the determination of the method of application to meet the specifications of use. However, all of the nicotinium salts herein disclosed are sufficiently soluble or dispersible in water to kill 90 percent of the fungus spores in laboratory tests.

As a preliminary step in commercial operation, it has been found advantageous to dissolve the toxicant in a carrier such as a water-soluble organic solvent hereinafter designated a coupling agent. When the solution of toxicant is added to the water in the final spray mixture, the toxicant is more efficiently and uniformly distributed. Examples of such suitable water-soluble solvents, or coupling agents, for the nicotinium salts herein shown are methyl alcohol, acetone, isopropyl alcohol, methyl ethyl ketone, ethyl alcohol, ethylene glycol monoethyl ether, diethylene glycol monoethyl ether, ethylene glycol monomethyl ether, ethylene glycol monobutyl ether, diethylene glycol monomethyl ether, and diethylene glycol monobutyl ether. These may be used singly or in combinataion with each other.

It was found further that those nicotinium salts having a total of at least 12 carbon atoms in the two R groups and having also a fatty acid anion, such as dilauryl nicotinium dioleate, dioctadecyl nicotinium diacetate, and dioctadecyl nicotinium divalerate, are soluble in carriers such as vegetable and mineral oils. This unusual characteristic permits the use of these compounds in combination with oils to provide both insecticidal and fungicidal action. These oil solutions of the toxicant and a suitable emulsifying agent produce uniform spray emulsions when added to water with efficient stirring. It is apparent, therefore, that the nicotinium salts of the invention are effective pesticides which can be applied in aqueous solutions or emulsions. Furthermore, they may be applied also as oil solutions or emulsions and as aerosols.

Compositions having concentrations of one part of toxicant in 100 to 10,000 parts of water may be applied to the foliage of apple trees for the control of the apple scab fungus, *Venturia inaequalis*, and other pests. At similar concentrations, the compositions may be used in the washing of oranges or apples for the inhibition of pathogens, for the drenching of flats of onion or similar seedlings, for the prevention of damping-off, and for the finishing of textiles to reduce mildew deterioration. They also can be used on surfaces containing fats or waxes where the prevention of mold growth is desirable, such as on cured meats, hides, or waxes for vegetables.

The oil-soluble members of this group, designated above, are soluble in such organic solvents as dichlorodifluoromethane, diethyl ether, and methyl chloride, which makes them ideally adapted for use in aerosol form. In this method of dispersion, they can be used for the treatment of tobacco seed beds for the control of downy mildew and for the control of fungous and bacterial contaminants in storage and warehouse rooms.

In some instances, the application or incorporation of a pesticide in a carrier such as a dust is desired, as for example in the treatment of seeds or for application to foliage. All members of this generic group of nicotinium compounds may be formulated with dusts such as pyrophyllite, vegetable flour, and so forth, depending upon the requirements of the particular use. Knowledge of the art is necessary to avoid too great fixation of the toxicant by the adjuvant and hence the lowering of its effective toxicity below the point where control is obtained.

The property of surface activity exhibited by all compounds shown in the foregoing table, with the exception of dimethyl nicotinium diiodide, makes them peculiarly well suited for the inhibition of fungus growth, in certain instances. Where complete coverage by a film of the toxicant solution is required, or where penetration into a porous matrix is advantageous, these members of the group are unique. On tomentose plant surfaces or on hair-covered animal skins, such fungicidal toxicants possess an advantage over those not inherently surface active.

Having thus described our invention, we claim:

1. A fungicidal composition comprising a carrier in which is incorporated a nicotinium salt having the general formula

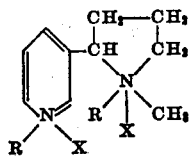

wherein R is a member of the group consisting of aralkyl and substituted aralkyl, and X is a member of the group consisting of chloride, bromide, iodide, cyanide, thiocyanate, and fatty acid anions having from 2 to 18 carbon atoms.

2. The composition of claim 1, wherein X is a thiocyanate anion.

3. The composition of claim 1, wherein X is a fatty acid anion having from 2 to 18 carbon atoms.

4. A fungicidal composition comprising dichlorobenzyl nicotinium dichloride incorporated in a carrier.

5. A fungicidal composition comprising di-(p-chlorobenzyl) nicotinium dichloride incorporated in a carrier.

CHARLES F. WOODWARD.
FRANK L. HOWARD.
HARRY L. KEIL.
LEOPOLD WEIL.

REFERENCES CITED

The following references are of record in the file of this patent:

UNITED STATES PATENTS

| Number | Name | Date |
|---|---|---|
| 2,048,885 | Oakeshott | July 28, 1936 |
| 2,176,896 | Epstein | Oct. 24, 1939 |

OTHER REFERENCES

Jour. of Econ. Entomology, Feb. 1941, pages 80–83 by Hanberry et al., copy in Division 63.

Martin, The Scientific Principles of Plant Protection, London, Edward Arnold & Co. 1936, pages 73–75.